United States Patent [19]

Habermann et al.

[11] 3,758,578

[45]* Sept. 11, 1973

[54] HYDRATION OF NITRILES TO AMIDES USING CUPREOUS CATALYSTS

[75] Inventors: Clarence E. Habermann; Ben A. Tefertiller, both of Midland, Mich.

[73] Assignee: The Dow Chemical Company, Midland, Mich.

[ * ] Notice: The portion of the term of this patent subsequent to Dec. 28, 1988, has been disclaimed.

[22] Filed: June 28, 1971

[21] Appl. No.: 157,648

Related U.S. Application Data

[63] Continuation-in-part of Ser. No. 835,765, June 23, 1971, Pat. No. 3,631,104.

[52] U.S. Cl.......... 260/561 N, 260/404, 260/561 R, 260/558 R

[51] Int. Cl.......................................... C07c 103/00

[58] Field of Search .................... 260/561 R, 561 N, 260/404

[56] References Cited
UNITED STATES PATENTS 3,631,104  12/1971  Habermann et al. .......... 260/561 N

FOREIGN PATENTS OR APPLICATIONS 2,036,126  2/1971  Germany .......................... 260/561

Primary Examiner—Lewis Gotts
Assistant Examiner—Ethel G. Love
Attorney—Herbert D. Knudsen and C. E. Rehberg

[57] ABSTRACT

Aliphatic nitriles are converted to the corresponding amides by contacting the nitrile in the presence of water with a cupreous catalyst containing copper prepared by reducing copper hydroxide or a copper salt.

10 Claims, No Drawings

HYDRATION OF NITRILES TO AMIDES USING CUPREOUS CATALYSTS

CROSS-REFERENCE TO RELATED APPLICATIONS

The present application is a continuation-in-part of our application Ser. No. 835,765, filed June 23, 1971, now U.S. Pat. No. 3,631,104.

In our prior application, we reported the discovery that copper metal in the proper form is a very effective catalyst for the conversion of nitriles to amides. In discussing the copper catalyst we stated:

The copper catalyst of the invention may be any conventional form of copper. Such copper metal catalysts may be purchased commercially or prepared by a number of known methods. Suitably such copper catalysts may be prepared by reducing copper oxide, by decomposing and reducing copper salts, such as, copper acetate, copper carbonate, copper hydroxide and copper oxalate or by reducing other copper salts, such as, copper halide, copper nitrate and copper sulfate. Copper catalysts prepared by reducing copper oxide are preferred.

BACKGROUND OF THE INVENTION

Hydration of nitriles in the presence of water has been accomplished by a number of copper catalysts. For example, Greene in U.S. Pat. No. 3,381,034 reacted various nitriles with water in the presence of soluble copper ions. The present invention is distinguished over this art because the catalysts of the invention contain copper prepared by reducing copper hydroxide or a copper salt. In contrast, Greene used copper metal as wire, turnings and powder to make her catalysts and indicated that this metal was not catalytic.

Watanabe in Bull. Chem. Soc. Japan, 32, 1280 (1959); 37, 1325 (1964); and 39, 8 (1966) shows the use of reduced copper chloride, a catalyst useful in the present invention. His catalysts were prepared by contacting copper chloride with zinc and were employed only to convert benzonitrile to benzamide. In contrast, the present invention converts aliphatic nitriles to the corresponding amide. Watanabe in Bull. Chem. Soc. Japan, 37, in the left column of page 1325 makes the broad statement that "[the] reaction of aliphatic nitriles is somewhat complicated and is different from that of aromatic ones: the yield of the amides is comparatively lower than that from aromatic nitriles, and the hydration reaction is accompanied by side reactions forming some acidic compounds." Although this general statement is apparently based on work done with nickel catalysts, it would be expected that similar results would be obtained with copper compounds. Contrary to this expected result, it has been found that for catalysts which contain copper prepared by reducing copper hydroxide or a copper salt, the reaction forms little or no by-products.

SUMMARY OF THE INVENTION

It has now been discovered according to the present invention that aliphatic nitriles are hydrated to the corresponding amide by contacting the nitrile in the presence of water with a cupreous catalyst containing copper prepared by reducing copper hydroxide or a copper salt.

Representative examples of copper salts that can be reduced to copper to give a desirable catalyst include: copper salts having nitrogen-containing anions, such as copper nitrate, copper nitrite, copper nitride, copper cyanide, copper nitroprusside and copper ferrocyanide; copper salts having halogen-containing anions, such as copper chloride, copper bromide, copper perchlorate, copper bromate and copper iodide; copper salts having sulfur-containing anions, such as copper sulfide, copper sulfate, copper sulfite and copper thiocyanate; copper salts having organic carboxylic acid-containing anions, such as copper carbonate, copper acetate, copper oxalate, copper butyrate, copper citrate, copper formate, copper benzoate and copper laurate; and other copper salts, such as copper borate, copper phosphate, copper carbide, copper chromate and copper tungstate.

Preferred catalysts are obtained by reducing copper hydroxide or copper salts having anions containing nitrogen, sulfur or organic carboxylic acids, with copper nitrate, copper acetate, copper carbonate, copper oxalate, copper sulfide, copper chloride and copper hydroxide being of special interest.

In the reduction of copper hydroxide or a copper salt to produce copper, the interrelationship of temperature, time, and nature and amount of reducing agent determines the extent of the reduction. For example, in a preferred hydrogen reduction, the temperature may range from about 50° to about 500°C. or more, with temperatures of about 150° to about 350°C. being preferred. Unnecessarily high temperatures have a tendency to reduce the activity of the resulting catalysts. The time and quantity are preferably adjusted to give essentially complete reduction to the copper metal. After reduction, the catalyst is preferably protected from contact with the atmosphere.

The reduction of the copper salt to the desired catalyst may be monitored and controlled by measuring either the quantity of reducing agent reacted, the amount of by-product formed or the weight loss. The progress of the reduction may also be determined by x-ray diffraction, x-ray fluorescence or elemental analysis.

Although reduction of the copper salt with hydrogen is convenient, other reducing agents may also be employed. For example, the catalyst may be prepared by contacting the salt under the appropriate conditions with hydrazine, carbon, carbon monoxide, $NH_2OH$, $NaBH_4$, $Na_2S_2O_4$, a lower alkane or a lower alkanol or other reducing agent. Preferred liquid phase reducing agents are $NaBH_4$ and hydrazine.

As examples of reductions of the invention, catalysts are prepared by contacting under aqueous conditions a soluble copper salt, such as $CuCl_2$, $CuBr_2$, $Cu(NO_3)_2$, $Cu(ClO_3)_2$, copper oxalate, copper formate, copper acetate, $Cu(NH_3)_4S_2O_6$, $Cu(NH_3)_4CrO_4$ or $Cu(OH)_2$ with a reducing agent such as $NH_2OH$, $NaBH_4$, $N_2H_4$, $Na_2S_2O_4$ or an active metal such as zinc. Also, under anhydrous conditions, copper hydroxide or any copper salt, such as $CuC_2$, $Cu(ClO_3)_2$, $CuCrO_4$, copper formate, copper acetate, $CuCl_2$, $CuBr_2$, $Cu(NO_3)_2$, $CuC_2O_4$, copper stearate, copper tartrate, $CuS$, $Cu(NH_3)_4CrO_4$ or $Cu(NH_3)_4S_2O_6$ are reduced by contact with a reducing agent, such as hydrogen. The optimum conditions for such reductions vary widely as different salts and reducing agents are employed.

With proper reduction, the copper catalysts of the invention are very desirable catalysts for making amides from aliphatic nitriles. In addition to the high conversions and yields produced, the catalysts have long effective lives, and little or no deleterious by-products or waste products requiring separation are formed.

Any aliphatic nitrile may suitably be used in the present invention, with hydrocarbon nitriles containing up to about 20 or more carbon atoms being preferred. Representative examples of suitable nitriles include: saturated aliphatic hydrocarbon nitriles such as acetonitrile, propionitrile, pentanonitrile, dodecanonitrile, succinonitrile, adiponitrile and the like; and unsaturated aliphatic hydrocarbon nitriles such as acrylonitrile, methacrylonitrile, crontonic nitrile, β-phenylacrylonitrile, 2–cyano–2–butene, 1–cyano–1–octene, 10–undecenonitrile, maleonitrile, fumaronitrile. Of the nitriles suitable for use in the invention, the olefinic nitriles of three to six carbon atoms are especially preferred, with the conversion of acrylonitrile to acrylamide being of special interest.

The proportions of nitrile to water in the reactant mixture may vary widely because any amount of water that gives the hydration is acceptable. More important than the specific nitrile to water ratio is the extent of the interaction between the nitrile and water. A high degree of contact is desirable to assure the greatest efficiency in the reaction. For gaseous reactants, the nitrile and water are miscible in all proportions, but for liquid reactants, certain precautions may be helpful to insure that intimate contact of the nitrile and water is maintained. The necessary contact may be realized by dissolving the nitrile in the water or by dissolving the water in the nitrile. Outside of the limits of the solubility of one of the reactants in the other, however, the reactant mixture may be agitated, a suitable solvent may be added or another means of increasing the contact of the reactants may be employed. Excess water is the preferred solvent although other inert solvents, such as alkanols, dioxane, dimethyl sulfoxide, acetone, dimethyl ether of ethylene glycol or tetrahydrofuran, may also be used.

The catalysts of the invention are convenient to use in both a batch process and a continuous flow process. Using either method, the nitrile and water are contacted with the catalyst under the appropriate reaction conditions, and the amide product is then recovered. Since the catalysts of the present invention are normally employed as essentially insoluble heterogeneous catalysts, a continuous flow reaction is preferred. For catalysts which are powders, a counter-current flow reactor would be employed.

In a continuous flow reaction, the solid catalyst of the invention is packed into a reaction chamber having an inlet for reactants and an outlet for products. The reaction chamber is maintained at the desired reaction temperature and the rate of flow of reactants over the catalyst is controlled to give the desired contact of the reactants with the catalyst. The reactants may be fed over the solid catalyst as a gas or, preferably, as a liquid. The reaction product from the reactor may be used as such or purified by any known technique.

The temperature of the reaction may vary widely as different nitriles are used in the invention. Generally, the reaction is conducted within a temperature range of about 0° to about 400°C. At temperatures below this level, the reaction is impractically slow. Above this range, the reaction forms an increasing amount of undesirable by-products. Within the broad temperature range and when operating in the liquid phase, temperatures of about 25° to about 200°C. are preferred. For unsaturated nitriles which tend to polymerize, a reaction temperature of less than about 200°C., the use of polymerization inhibitors or dilute reaction solutions are desirable to avoid polymerization of the nitrile and possible poisoning of the catalyst.

The other reaction conditions are known in the art of using heterogeneous catalysts and are not critical in the invention. The important aspect of the invention is the use of the cupreous catalyst containing copper prepared by reducing a copper salt to convert nitriles to the corresponding amides.

SPECIFIC EMBODIMENTS

Examples 1–11 — Using Salts Reduced with Hydrogen

A number of copper catalysts were prepared by heating about 20 g. of a copper salt in a 640 cc./min. flow of a gaseous hydrogen stream containing 20 percent hydrogen in nitrogen for four hours. The catalysts were tested for catalytic activity by loading one gram of the catalyst in a glass ampoule and adding 5 cc. of a 7 percent acrylonitrile-in-water solution. The ampoule was sealed and heated to the temperature specified for one hour. After the reaction, the ampoule was cooled and the contents were analyzed by vapor phase chromatography. The results of these experiments are shown in Table I. No by-products were observed. The indicated conversions and yields are based on acrylonitrile consumed.

TABLE I.—HYDRATION OF ACRYLONITRILE TO ACRYLAMIDE USING COPPER CATALYSTS PREPARED BY REDUCING COPPER SALTS WITH HYDROGEN

| Example: | Copper salt reduced | Reduction temp. °C. | Hydration, percent | | | |
|---|---|---|---|---|---|---|
| | | | 80° C. | | 130° C. | |
| | | | Conv. | Yield | Conv. | Yield |
| 1 | $Cu(NO_3)_2$ | 175 | 7 | 0 | 34 | 1.1 |
| 2 | $Cu(NO_3)_2$ | 275 | 7 | 100 | 59 | 85 |
| 3 | $Cu_2C_2O_4$ | 275 | 46 | 0 | 36 | 2.7 |
| 4 | $Cu(Ac)_2$ | 275 | 21 | 21 | 48 | .38 |
| 5 | $CuCl_2$ | 300 | 38 | 0 | 38 | 0.3 |
| 6 | CuCl | 300 | 41 | 0 | 45 | 3.6 |
| 7 | CuBr | 300 | 18 | 0 | 17 | 1.4 |
| 8 | $CuSO_4$ | 300 | 3 | 0 | 4 | 3 |
| 9 | $CuCO_3$ | 175 | 74 | 97 | (¹) | (¹) |
| 10 | $CuC_2O_4$ | 175 | 16 | 90 | (¹) | (¹) |
| 11 | Cu-Cr ² | 175 | 62 | 95 | (¹) | (¹) |

¹ No data. ² Carbonate.

Examples 12–16 — Reduction of Copper Salts with NaBH₄

Various copper salts were treated with 200 cc. of a 0.5 molar solution of $NaBH_4$ in water for one hour at 25°C. These catalysts were tested as shown in the examples above, and the results are shown in Table II. No by-products were detected in the product.

TABLE II

Hydration of Acrylonitrile to Acrylamide using Copper Catalysts Prepared by Reducing Copper Salts with $NaBH_4$

| Ex. | Copper Salt Reduced | Hydration at 100°C. for 1 hr. Conversion | Yield |
|---|---|---|---|
| 12 | Cu(NO$_3$)$_2$ | 98.9 | 90.5 |
| 13 | Cu(C$_2$H$_3$O$_2$)$_2$ | 100 | 86.6 |
| 14 | CuCrO$_4$[a] | 9.9 | 28.6 |
| 15 | CuC$_2$O$_4$ | 100 | 91.6 |
| 16 | Copper Tartrate | 51.6 | 80.1 |

[a] 0.25 g. of catalyst employed rather than 1 g.

Example 17 — Reduction of CuCl$_2$ with Zn

To prepare a Urushibara-A copper catalyst, zinc was added to an aqueous solution of cupric chloride to precipitate metallic copper. After the evolution of gas had ceased, the product was leached with acetic acid to form the desired catalyst. Using the same procedure as shown in Example 1, 0.51 g. of the catalyst was used to hydrate acrylonitrile to acrylamide at 75°C. for one hour. The conversion of the nitrile was 16 percent with a 55.2 percent yield of the amide. No by-products were observed.

Example 18 — Reduction of Copper Nitrate with Hydrazine

Copper nitrate was reduced to copper metal by contacting 0.1 mole of Cu(NO$_3$)$_2$ in 100 cc. of water with 200 cc. of 0.1 molar aqueous hydrazine over a one hour period at 25°C. One gram of the copper catalyst prepared was reacted with 5 cc. of a 7 percent aqueous acrylonitrile solution at 100°C. for one hour. The acrylonitrile was 11.2 percent converted to give a 9.8 percent yield of acrylamide. No by-products were detected.

In the same manner as described above, other copper salts are reduced to obtain desirable copper catalysts. For example, a solution of cupric nitrate is reduced with metallic zinc to give a desirable copper catalyst that is employed in the conversion of acrylonitrile to acrylamide, methacrylonitrile to methacrylamide or pentanonitrile to pentanoamide.

We claim:

1. In the process for converting an aliphatic nitrile to the corresponding amide by reacting the nitrile with water in the presence of a catalyst, the improvement comprising conducting the reaction in the presence of a catalytic amount of copper prepared by reducing copper hydroxide or a copper salt.

2. The process of claim 1 wherein the catalyst is obtained from copper hydroxide or a copper salt having an anion containing nitrogen, sulfur or an organic carboxylic acid.

3. The process of claim 1 wherein the catalyst is obtained from copper nitrate, copper acetate, copper carbonate, copper oxalate, copper sulfide, copper chloride or copper hydroxide.

4. The process of claim 1 wherein the catalyst is obtained from copper nitrate, copper acetate or copper oxalate.

5. The process of claim 1 wherein the catalyst is prepared by a hydrogen reduction at a temperature of about 50° to about 500°C.

6. The process of claim 5 wherein the temperature is about 150° to about 350°C.

7. The process of claim 1 wherein the copper hydroxide or copper salt is reduced with NaBH$_4$ or hydrazine in the liquid phase.

8. The process of claim 1 wherein the reducing agent is an active metal.

9. The process of claim 1 wherein the nitrile is an olefinic nitrile of three to six cabron atoms.

10. The process of claim 1 wherein the nitrile is acrylonitrile.

* * * * *